United States Patent
Unoki et al.

(10) Patent No.: US 7,132,199 B2
(45) Date of Patent: Nov. 7, 2006

(54) NON-AQUEOUS ELECTROLYTE AND NON-AQUEOUS ELECTROLYTE SECONDARY BATTERY

(75) Inventors: Shigeyuki Unoki, Katano (JP); Hajime Konishi, Ikoma (JP); Katsumi Yamashita, Fujisawa (JP); Shoichiro Watanabe, Nara (JP); Takashi Takeuchi, Hirakata (JP); Hideharu Takezawa, Katano (JP); Toshikazu Hamamoto, Ube (JP); Akira Ueki, Ube (JP); Koji Abe, Ube (JP)

(73) Assignees: Matsushita Electric Industrial Co., Ltd., Osaka (JP); Ube Industries, Ltd., Yamaguchi (JP)

( * ) Notice: Subject to any disclaimer, the term of this patent is extended or adjusted under 35 U.S.C. 154(b) by 491 days.

(21) Appl. No.: 10/311,811

(22) PCT Filed: Jun. 11, 2001

(86) PCT No.: PCT/JP01/04924
§ 371 (c)(1),
(2), (4) Date: Dec. 20, 2002

(87) PCT Pub. No.: WO02/01665
PCT Pub. Date: Jan. 3, 2002

(65) Prior Publication Data
US 2004/0091786 A1 May 13, 2004

(30) Foreign Application Priority Data
Jun. 26, 2000 (JP) ............................. 2000-191795
Nov. 20, 2000 (JP) ............................. 2000-352185

(51) Int. Cl.
*H01M 6/16* (2006.01)
*H01M 6/14* (2006.01)
*H01M 6/18* (2006.01)

(52) U.S. Cl. ............ 429/338; 429/306; 429/322; 429/324

(58) Field of Classification Search ............. 429/306, 429/322, 324, 338; 428/306, 322, 324, 338
See application file for complete search history.

(56) References Cited

U.S. PATENT DOCUMENTS 4,472,489 A * 9/1984 Maxfield et al. ............ 429/213

(Continued)

FOREIGN PATENT DOCUMENTS

CN 1277468 A 12/2000

(Continued)

OTHER PUBLICATIONS

Copy of Office Action dated Jan. 20, 2006 from Chinese Patent Office in counterpart Chinese Application No. 200410056407.2.

(Continued)

*Primary Examiner*—Dah-Wei Yuan
(74) *Attorney, Agent, or Firm*—Akin Gump Strauss Hauer & Feld, LLP (57) ABSTRACT

A non-aqueous electrolyte containing propylene carbonate and 1,3-propanesultone as additives can reduce the amount of a gas evolved during storage at a high temperature of a non-aqueous electrolyte secondary cell comprising the electrolyte, a non-aqueous electrolyte containing at least one compound selected from the group consisting of vinylene carbonate, diphenyl disulfide, di-p-tolydisulfide and bis(4-methoxyphenyl)disulfide as comprising the electrolyte, and a non-aqueous electrolyte containing a combination of the above-two types of additives can provide a non-aqueous electrolyte secondary cell exhibiting excellent retention of capacity and storage stability.

12 Claims, 2 Drawing Sheets

U.S. PATENT DOCUMENTS

| | | | |
|---|---|---|---|
| 4,528,254 A * | 7/1985 | Wolf et al. | 429/336 |
| 4,888,255 A * | 12/1989 | Yoshimitsu et al. | 429/101 |
| 5,626,981 A * | 5/1997 | Simon et al. | 429/105 |
| 6,033,809 A * | 3/2000 | Hamamoto et al. | 429/340 |
| 6,413,678 B1 | 7/2002 | Hamamoto | |
| 6,623,892 B1 * | 9/2003 | Yamaguchi et al. | 429/338 |
| 6,699,998 B1 | 3/2004 | Hamamoto | |
| 2005/0042521 A1 | 2/2005 | Hamamoto | |

FOREIGN PATENT DOCUMENTS

| | | | |
|---|---|---|---|
| JP | 10-247517 A | | 9/1998 |
| JP | 11-067266 A | | 3/1999 |
| JP | 2000-138071 | * | 5/2000 |
| JP | 2000-149986 A | | 5/2000 |
| JP | 2000-149987 | * | 5/2000 |
| JP | 2000138071 A | | 5/2000 |
| JP | 2000149987 A | | 5/2000 |
| JP | 2000-306602 A | | 11/2000 |
| JP | 2001-043895 A | | 2/2001 |
| JP | 2001052738 A | | 2/2001 |
| JP | 2001-160417 A | | 6/2001 |

OTHER PUBLICATIONS

Copy of Office Action dated Feb. 13, 2006 from European Patent Office in counterpart European Application No. 01938597.0.

* cited by examiner

FIG. 1

FIG. 2

NON-AQUEOUS ELECTROLYTE AND NON-AQUEOUS ELECTROLYTE SECONDARY BATTERY

CROSS-REFERENCE TO RELATED APPLICATION

This application is a Section 371 of International Application No. PCT/JP01/04924, filed Jun. 11, 2001, the disclosure of which is incorporated herein by reference.

TECHNICAL FIELD

The present invention relates to a non-aqueous electrolyte capable of providing a non-aqueous electrolyte secondary battery with excellent cycle characteristics, capacity retention rate and storage characteristics and a reduced amount of gas generated during high-temperature storage, and also relates to a secondary battery using the non-aqueous electrolyte.

BACKGROUND ART

In recent years, there has been a rapid advancement in the development of potable and cordless electronic apparatuses. With the development, there has been an increasing demand for small-size, light-weight, thin, and high energy density secondary batteries that serve as the power supply for these apparatuses.

In particular, since non-aqueous electrolyte secondary batteries, such as lithium ion secondary batteries and lithium polymer secondary batteries, have a high voltage and high energy density and can be made thin, the development thereof is on the increase.

For the positive electrodes of non-aqueous electrolyte secondary batteries, various kinds of lithium-containing composite oxides capable of absorbing and desorbing lithium by charging and discharging are generally used as active materials.

On the other hand, for the negative electrodes of non-aqueous electrolyte secondary batteries, there are ones containing metal lithium as an active material; and ones containing a metal compound or a carbon material capable of absorbing and desorbing lithium by charging and discharging. At present, carbon materials are often used for the negative electrodes.

Normally, on the surface of a negative electrode using a carbon material, an SEI (Solid Electrolyte Interface) film is formed by the reaction between an electrolyte and the negative electrode, and the chemical stability of the negative electrode is maintained by this film. However, during storage of the battery at high temperature, the film cracks easily, and there arises the problem that the negative electrode and the non-aqueous solvent in the electrolyte react with each other in the cracked portion and generate a gas.

In a lithium polymer secondary battery, in order to reduce the size, weight and thickness, a bag-shaped outer packaging material made of a laminated sheet comprising resin films and a metal foil sandwiched therebetween is often used in place of a metal case used for a lithium ion secondary battery. In this case, even when a small amount of a gas is generated, there will be problems, such as an increase in the thickness of the battery, leakage of the electrolyte and deterioration of the charge and discharge characteristics, due to an increase in the internal pressure of the battery.

Moreover, there is a problem that a carbon material easily separates from a negative electrode during charging of a battery. It is considered that this is caused by distortion of the carbon material due to a gas generated during an electrochemical reduction of a non-aqueous solvent at the interface between the carbon material in the negative electrode and the non-aqueous electrolyte.

Furthermore, when binders contained in a positive electrode and negative electrode are swollen with an electrolyte during charge/discharge cycle and storage of the battery, there arises the problem that the impedances of the electrodes increase and the battery capacity decreases gradually.

DISCLOSURE OF INVENTION

In view of the above problems, it is an object of the present invention to provide a non-aqueous electrolyte capable of providing a non-aqueous electrolyte secondary battery with excellent cycle characteristics, capacity retention ratio and storage characteristics and a reduced amount of gas generated during high-temperature storage; and a non-aqueous electrolyte secondary battery using the non-aqueous electrolyte.

The present invention relates to a non-aqueous electrolyte which comprises a non-aqueous solvent and a solute dissolved in the non-aqueous solvent, and contains propylene carbonate and 1,3-propanesultone as additives, respectively. Here, the non-aqueous electrolyte preferably contains 0.1 to 5.0 parts by weight of propylene carbonate and 0.1 to 6.5 parts by weight of 1,3-propanesultone per 100 parts by weight of the non-aqueous solvent. Further, the non-aqueous electrolyte preferably contains at least one selected from the group consisting of vinylene-carbonate, diphenyl disulfide, di-p-tolyl disulfide and bis(4-methoxyphenyl) disulfide as an additive.

The present invention also relates to a non-aqueous electrolyte which comprises a non-aqueous solvent and a solute dissolved in the non-aqueous solvent, contains 0.1 to 5.0 parts by weight of propylene carbonate and 0.1 to 6.5 parts by weight of 1,3-propanesultone as additives per 100 parts by weight of the non-aqueous solvent, and further contains 0.1 to 5.0 parts by weight of vinylene carbonate or 0.1 to 0.6 parts by weight in total of at least one selected from the group consisting of diphenyl disulfide, di-p-tolyl disulfide and bis(4-methoxyphenyl) disulfide as an additive per 100 parts by weight of the non-aqueous solvent.

Moreover, the present invention relates to a non-aqueous electrolyte which comprises a non-aqueous solvent and a solute dissolved in the non-aqueous solvent, contains 0.1 to 5.0 parts by weight of propylene carbonate and 0.1 to 6.5 parts by weight of 1,3-propanesultone as additives, respectively, per 100 parts by weight of the non-aqueous solvent, and further contains 0.1 to 5.0 parts by weight of vinylene carbonate and 0.1 to 0.6 parts by weight in total of at least one selected from the group consisting of diphenyl disulfide, di-p-tolyl disulfide and bis(4-methoxyphenyl) disulfide as additives, respectively, per 100 parts by weight of the non-aqueous solvent. In this case, the total amount of propylene carbonate, 1,3-propanesultone, vinylene carbonate and at least one selected from the group consisting of diphenyl disulfide, di-p-tolyl disulfide and bis(4-methoxyphenyl) disulfide is preferably 0.4 to 17.1 parts by weight per 100 parts by weight of the non-aqueous solvent.

Furthermore, the present invention relates to a non-aqueous electrolyte which comprises a non-aqueous solvent and a solute dissolved in the non-aqueous solvent, and contains vinylene carbonate and at least one selected from the group consisting of diphenyl disulfide, di-p-tolyl disulfide and bis(4-methoxyphenyl) disulfide as additives, respectively.

Here, the non-aqueous electrolyte preferably contains 0.1 to 5.0 parts by weight of vinylene carbonate and 0.1 to 0.6 parts by weight in total of at least one selected from the group consisting of diphenyl disulfide, di-p-tolyl disulfide and bis(4-methoxyphenyl) disulfide per 100 parts by weight of the non-aqueous solvent.

The non-aqueous solvent used in the present invention is preferably composed of 10 to 70 wt % cyclic carbonate and 30 to 90 wt % chain carbonate. In this case, the cyclic carbonate preferably comprises at least one selected from the group consisting of ethylene carbonate, propylene carbonate and butylene carbonate. Moreover, the chain carbonate preferably comprises at least one selected from the group consisting of dimethyl carbonate, diethyl carbonate and ethyl methyl carbonate.

Here, in the present invention, 1,3-propanesultone, vinylene carbonate, diphenyl disulfide, di-p-tolyl disulfide and bis(4-methoxyphenyl) disulfide are all used as additives. Therefore, these additives are not dealt with as the non-aqueous solvent. On the other hand, propylene carbonate is sometimes used as an additive, and sometimes used as the non-aqueous solvent. In the case where 10 wt % or more non-aqueous solvent in the non-aqueous electrolyte is propylene carbonate, the propylene carbonate is not used as the additive. In this case, the propylene carbonate is used as the non-aqueous solvent, and only 1,3-propanesultone, vinylene carbonate, diphenyl disulfide, di-p-tolyl disulfide and bis(4-methoxyphenyl) disulfide are used as additives. In other words, the propylene carbonate exhibits an effect as the additive only when the propylene carbonate is not a main component of the non-aqueous solvent.

The present invention also relates to a secondary battery comprising a positive electrode containing a lithium-containing composite metal oxide; a negative electrode containing graphite; and any one of the above-mentioned non-aqueous electrolytes.

It is preferred that at least one of the positive electrode and the negative electrode contains a fluorocarbon resin as a binder. In this case, the fluorocarbon resin is preferably at least one selected from the group consisting of polyvinylidene fluoride, a copolymer of vinylidene fluoride and hexafluoropropylene, and polytetrafluoroethylene.

The graphite is natural graphite or artificial graphite, and the spacing ($d_{002}$) between lattice planes (002) is preferably 3.350 to 3.400 angstroms.

BEST MODE FOR CARRYING OUT THE INVENTION

A non-aqueous solvent used in the present invention preferably contains cyclic carbonate and chain carbonate as main components. For example, it is preferred that the non-aqueous solvent is composed of 10 to 70 wt % cyclic carbonate and 30 to 90 wt % chain carbonate.

Preferred examples of the cyclic carbonate are ethylene carbonate, propylene carbonate, and butylene carbonate. These may be used alone or in combination of two or more of them. However, as described above, only when 10 wt % or more of the non-aqueous solvent in a non-aqueous electrolyte is propylene carbonate, the propylene carbonate is usable as a cyclic carbonate of the non-aqueous solvent.

Preferred examples of the chain carbonate are dimethyl carbonate, diethyl carbonate and ethyl methyl carbonate. These may be used alone or in combination of two or more of them.

As a solute usable in the present invention, there are $LiClO_4$, $LiBF_4$, $LiPF_6$, $LiAlCl_4$, $LiSbF_6$, LiSCN, LiCl, $LiCF_3SO_3$, $LiCF_3CO_2$, $LiN(C_2F_5SO_2)_2$, $LiAsF_6$, $LiN(CF_3SO_2)_2$, $Li_2B_{10}Cl_{10}$, lithium low aliphatic carboxylate, LiBr, LiI, lithium chloroborate, lithium tetraphenyl borate, imides, etc. These may be used alone or in combination of two or more of them. Among these, it is preferred to use $LiPF_6$ alone, or a combination of $LiPF_6$ with another solute.

A non-aqueous electrolyte of the present invention can be prepared by dissolving the above-mentioned solute in the non-aqueous solvent at a concentration of 0.5 to 1.5 mol/L, for example, and then dissolving the additive.

Materials other than the non-aqueous electrolyte that constitute a non-aqueous electrolyte secondary battery of the present invention are not particularly limited. It is possible to use conventionally used materials.

As a positive electrode material, for example, it is possible to use a lithium-containing composite metal oxide capable of absorbing and desorbing lithium ions by charge/discharge. As the lithium-containing composite metal oxide, for example, it is possible to use $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, and $Li_xMn_{2-y}M_yO_4$. These may be used alone or in combination of two or more of them. Here, M is at least one element selected from the group consisting of Na, Mg, Sc, Y, Mn, Fe, Co, Ni, Cu, Zn, Al, Cr, Pb, Sb and B, x=0 to 1.2, y=0 to 0.9, and z=2.0 to 2.3. Moreover, the value of x is the value before starting the charging and discharging, and increased or decreased by charge/discharge.

In addition to those mentioned above, it is also possible to use a transition metal chalcogenide, lithium vanadium oxide compound, and lithium niobium oxide compound.

The average particle size of a positive electrode material is not particularly limited, but is preferably 1 to 30 μm.

As a negative electrode material, for example, it is possible to use carbon materials capable of absorbing and desorbing lithium ions by charge/discharge. Among them, graphite having a graphite-type crystal structure is particularly preferred. For example, it is preferred to use natural graphite or artificial graphite. In particular, it is preferred to use graphite wherein the spacing ($d_{002}$) between lattice planes (002) is 3.350 to 3.400 angstroms.

As a binder to adhere the particles of a positive electrode material or a negative electrode material together, a fluorocarbon resin is preferred. For example, it is preferred to use polyvinylidene fluoride, a copolymer of vinylidene fluoride and hexafluoropropylene, and polytetrafluoroethylene. These may be used alone or in combination of two or more of them.

In the present invention, propylene carbonate and 1,3-propanesultone added to a non-aqueous electrolyte contribute to stable formation of an SEI film on the surface of a carbon material of a negative electrode. This film is a stable film which does not crack even when the battery is stored at a high temperature. Even when an active, high-crystalline carbon material such as natural graphite or artificial graphite is contained in a negative electrode, it is possible to reduce the decomposition of a non-aqueous solvent during high-temperature storage and reduce the generation of gas as the carbon material is coated with this film. In addition, this film will never interfere with proper charge/discharge reactions of the battery.

In the present invention, vinylene carbonate, diphenyl disulfide, di-p-tolyl disulfide and bis(4-methoxyphenyl) disulfide added to a non-aqueous electrolyte contribute to stable formation of an SEI film on the surface of a carbon material of a negative electrode. This film is kept stable even when the charge/discharge of the battery is repeated. Moreover, this film will never interfere with proper charge/discharge reactions of the battery. The generation of a gas due to an electrochemical reduction of a non-aqueous solvent is reduced by the function of this film.

As a result, it becomes possible to reduce separation of a carbon material from a negative electrode and improve the cycle characteristics.

Furthermore, diphenyl disulfide, di-p-tolyl disulfide and bis(4-methoxyphenyl) disulfide form an SEI film comprising a non-aqueous solvent and a carbon material and are tonically bonded to polar terminal groups of a binder of a negative electrode, thereby reducing the swelling of the binder with the non-aqueous solvent. It is considered therefore that the adhesion between electrode material particles is maintained, an increase in impedances of the electrodes is limited, and the cycle characteristics are further improved.

As a separator interposed between the positive electrode and the negative electrode, for example, a micro-porous thin film with a high ion permeability, predetermined mechanical strength and insulation performance is used. As such a thin film, for example, it is possible to use a sheet, woven fabric or non-woven fabric comprising polyolefin, such as polypropylene and polyethylene, or glass fibers having resistance to organic solvents and hydrophobicity.

In a lithium polymer battery, a film comprising a polymer material that absorbs and retains a non-aqueous electrolyte is used. It is possible to make contained a polymer material that absorbs and retains a non-aqueous electrolyte in at least one of a positive electrode material mixture and a negative electrode material mixture. Then, by interposing a film comprising the polymer material retaining the non-aqueous electrolyte between a positive electrode and a negative electrode and integrating them, an electrode group of a lithium polymer battery can be obtained.

A preferred example of a polymer material for absorbing and retaining a non-aqueous electrolyte is a copolymer of vinylidene fluoride and hexafluoropropylene.

The pore size in a separator is preferably a size that does not pass an active material, binder and conductive agent separated from a positive electrode or a negative electrode, and, for example, 0.01 to 1 μm. Moreover, in order to ensure safety at the time of a short-circuit, it is preferred that the separator has the function to close the pores by melting at a certain temperature or higher temperature and increase the resistance.

The thickness of a separator is generally 10 to 300 μm. Moreover, although the porosity is determined according to the ion permeability, the kind of the material and film thickness, it is generally 30 to 80%.

The present invention is applicable to non-aqueous electrolyte secondary batteries of coin type, button type, sheet type, cylindrical type, flat type, rectangular type, etc. In addition, the present invention is also applicable to large-size batteries for use in electric vehicles, for example.

While a non-aqueous electrolyte secondary battery of the present invention can be used for portable information terminals, portable electronic apparatuses, motorcycles, electronic vehicles and hybrid vehicles, for example, it is not particularly limited to these applications.

The following description will explain the present invention in detail based on some examples thereof.

Figure 1:
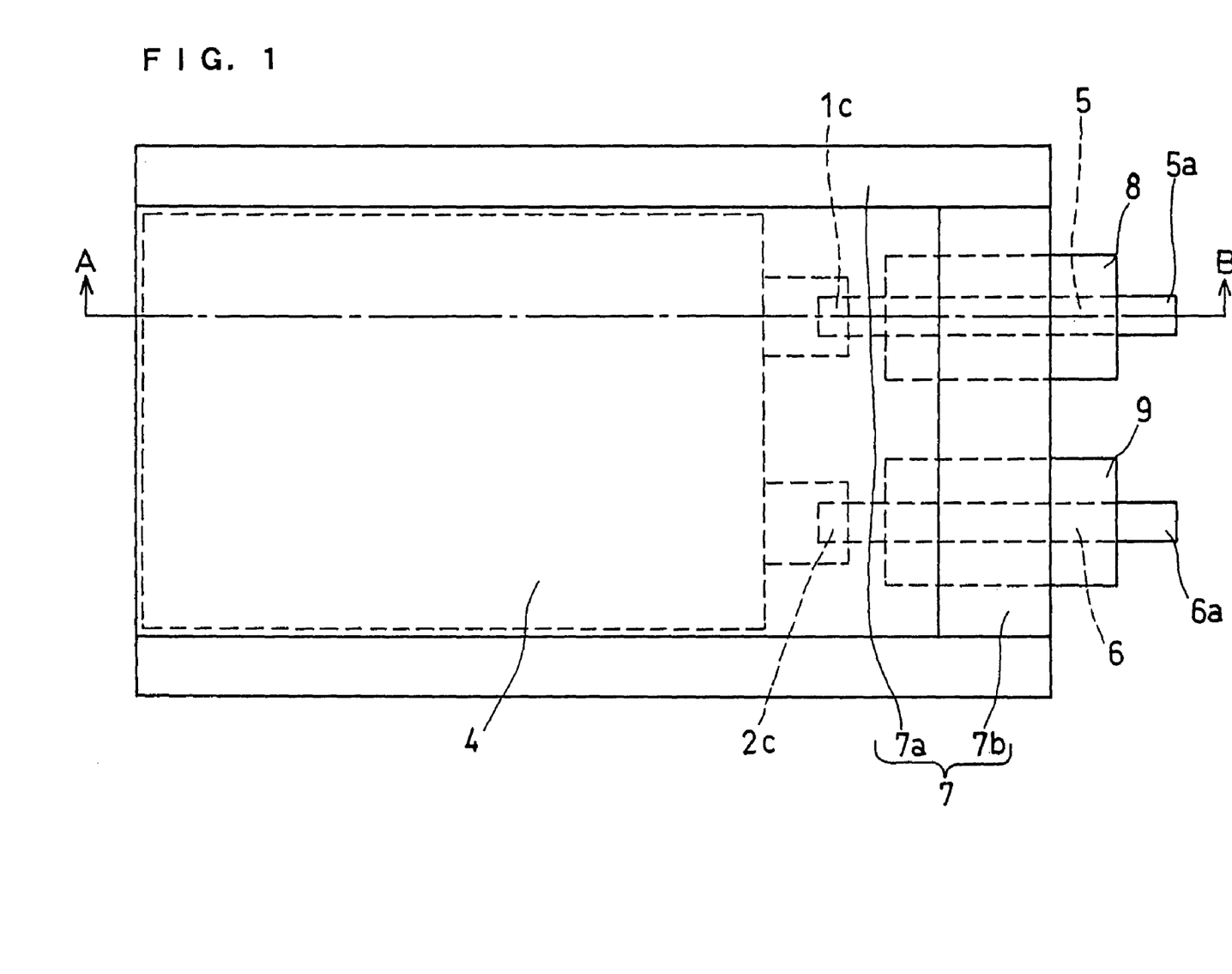
FIG. 1 is a front view showing an internal structure of the batteries produced in the examples of the present invention and comparative examples by broken lines.
Figure 2:
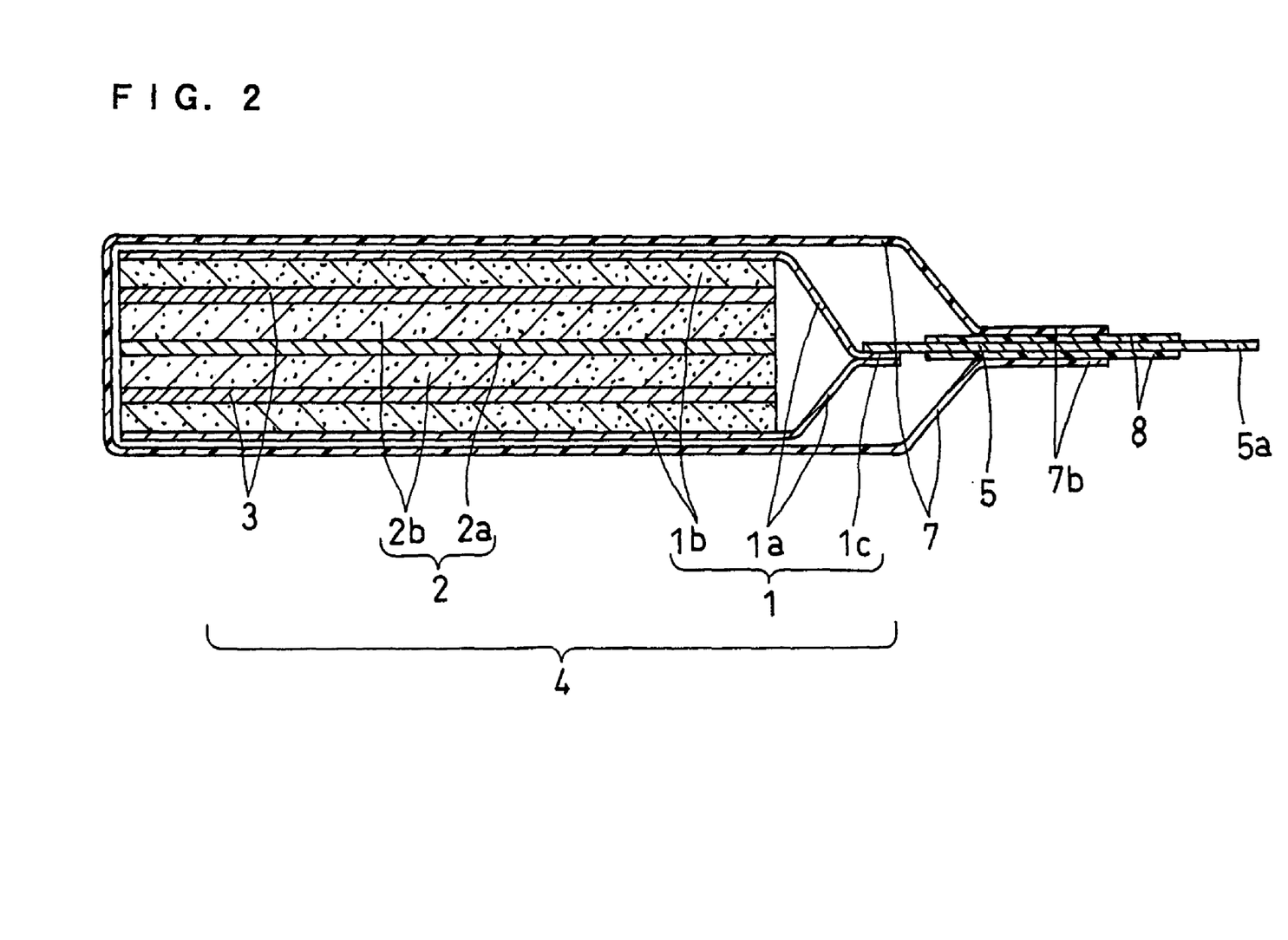
FIG. 2 is a vertical cross sectional view of the batteries produced in the examples of the present invention and comparative examples.

FIG. 1 is a front view of a lithium polymer secondary battery produced in the examples of the present invention and comparative examples. FIG. 2 is the A–B cross sectional view of the lithium polymer secondary battery. Referring to FIG. 1 and FIG. 2, the following description will explain methods of fabricating a positive electrode plate and a negative electrode plate constituting the lithium polymer secondary battery, and a method of producing a battery.

(i) Method of Fabricating a Positive Electrode Plate

A paste was prepared by mixing 100 parts by weight of $LiCoO_2$ as a positive electrode active material, 3 parts by weight of acetylene black as a conductive agent, 4 parts by weight of a copolymer of vinylidene fluoride and hexafluoropropylene as a binder, and 40 parts by weight of N-methyl-2-pyrolidone. This paste was coated on a positive electrode current collector 1a made of a lath aluminum foil, dried and rolled to form a positive electrode material mixture layer 1b, and thereby obtained a positive electrode plate 1.

(ii) Method of Fabricating a Negative Electrode Plate

A paste was prepared by mixing 100 parts by weight of artificial graphite ($d_{002}$=3.355 angstroms) as a negative electrode active material, 6 parts by weight of a copolymer of vinylidene fluoride and hexafluoropropylene as a binder, and 120 parts by weight of N-methyl-2-pyrolidone. This paste was coated on both surfaces of a current collector 2a made of a lath copper foil, dried and rolled to form a negative electrode mixture layer 2b, and thereby obtained a negative electrode plate 2.

(iii) Method of Producing a Battery

The negative electrode plate 2 was inserted between two pieces of the obtained positive electrode plates 1 with separators 3 comprising a copolymer of vinylidene fluoride and hexafluoropropylene interposed between them. The resultant stack was coalesced by pressure applied thereto while heating at 80° C., and thereby obtained an electrode group 4.

As shown in FIG. 1 and FIG. 2, in the positive electrode current collector 1a and the negative electrode current collector 2a, lead attaching portions 1c and 2c were formed respectively. Further, a positive electrode lead 5 made of aluminum foil was welded to the lead attaching portion 1c, and a negative electrode lead 6 made of a copper foil was welded to the lead attaching portion 2c.

Next, the electrode group 4 was stored inside a bag-shaped outer packaging material 7. At this time, the positive electrode lead 5 and negative electrode lead 6 were guided out of the outer packaging material 7. Then, the ends of the respective leads were made served as output/input terminals 5a and 6a of the positive electrode and negative electrode, respectively.

Placed in an opening of the outer packaging material 7 are resin films 8 and 9 for ensuring electrical insulation between the outer packaging material and the positive electrode lead 5 and negative electrode lead 6 and air tightness.

The outer packaging material 7 was made of a laminated sheet composed of an aluminum foil, a polypropylene film placed on the inner side of the aluminum foil and a polyethylene terephthalate film and a nylon film placed on the outer side. The outer packaging material 7 was fabricated by cutting this laminated sheet into a strip, folding the strip to half with the polypropylene film side facing inward and fusing two side edges 7a by heating in advance.

Further, after pouring a predetermined electrolyte into the outer packaging material 7, a peripheral part 7b of the opening was adhered by heating. Consequently, a lithium polymer secondary battery with a nominal capacity of 500 mAh was produced.

The following shows methods of preparing non-aqueous electrolytes used in lithium polymer secondary batteries produced in the respective examples and comparative examples.

EXAMPLE 1

A mixed solvent comprising ethylene carbonate (hereinafter referred to as EC), ethyl methyl carbonate (hereinafter referred to as EMC) and diethyl carbonate (hereinafter referred to as DEC) in a weight ratio of 4:5:2 was prepared. A non-aqueous electrolyte was obtained by adding 2.0 parts by weight of propylene carbonate (hereinafter referred to as PC) and 4.0 parts by weight of 1,3-propanesultone (hereinafter referred to as PS) to 100 parts by weight of this mixed solvent and further dissolving therein 1.35 mol/L of $LiPF_6$ as a solute.

COMPARATIVE EXAMPLE 1

A non-aqueous electrolyte was obtained by dissolving 1.35 mol/L of $LiPF_6$ in the same mixed solvent as in Example 1.

COMPARATIVE EXAMPLE 2

A non-aqueous electrolyte was obtained by adding 6.0 parts by weight of PC to 100 parts by weight of the same mixed solvent as in Example 1 and further dissolving therein 1.35 mol/L of $LiPF_6$ as a solute.

COMPARATIVE EXAMPLE 3

A non-aqueous electrolyte was obtained by adding 6.0 parts by weight of PS to 100 parts by weight of the same mixed solvent as in Example 1 and further dissolving therein 1.35 mol/L of $LiPF_6$ as a solute.

EXAMPLE 2

A non-aqueous electrolyte was obtained by adding 0.5 parts by weight of vinylene carbonate (hereinafter referred to as VC) and 0.1 parts by weight of diphenyl disulfide (hereinafter referred to as DPDS) to 100 parts by weight of the same mixed solvent as in Example 1 and further dissolving therein 1.35 mol/L of $LiPF_6$ as a solute.

EXAMPLE 3

A non-aqueous electrolyte was obtained by adding 0.5 parts by weight of VC and 0.1 parts by weight of di-p-tolyl disulfide (hereinafter referred to as DTDS) to 100 parts by weight of the same mixed solvent as in Example 1 and further dissolving therein 1.35 mol/L of $LiPF_6$ as a solute.

EXAMPLE 4

A non-aqueous electrolyte was obtained by adding 0.5 parts by weight of VC and 0.1 parts by weight of bis(4-methoxyphenyl) disulfide (hereinafter referred to as BMPDS) to 100 parts by weight of the same mixed solvent as in Example 1 and further dissolving therein 1.35 mol/L of $LiPF_6$ as a solute.

EXAMPLE 5

A non-aqueous electrolyte was obtained by adding 3.0 parts by weight of VC and 0.4 parts by weight of DPDS to 100 parts by weight of the same mixed solvent as in Example 1 and further dissolving therein 1.35 mol/L of $LiPF_6$ as a solute.

EXAMPLE 6

A non-aqueous electrolyte was obtained by adding 3.0 parts by weight of VC and 0.4 parts by weight of DTDS to 100 parts by weight of the same mixed solvent as in Example 1 and further dissolving therein 1.35 mol/L of $LiPF_6$ as a solute.

EXAMPLE 7

A non-aqueous electrolyte was obtained by adding 3.0 parts by weight of VC and 0.4 parts by weight of BMPDS to 100 parts by weight of the same mixed solvent as in Example 1 and further dissolving therein 1.35 mol/L of $LiPF_6$ as a solute.

EXAMPLE 8

A non-aqueous electrolyte was obtained by adding 0.5 parts by weight of VC, 0.1 parts by weight of DPDS and 0.1 parts by weight of BMPDS to 100 parts by weight of the same mixed solvent as in Example 1 and further dissolving therein 1.35 mol/L of $LiPF_6$ as a solute.

EXAMPLE 9

A non-aqueous electrolyte was obtained by adding 0.5 parts by weight of VC, 0.1 parts by weight of DTDS and 0.1 parts by weight of BMPDS to 100 parts by weight of the same mixed solvent as in Example 1 and further dissolving therein 1.35 mol/L of $LiPF_6$ as a solute.

EXAMPLE 10

A non-aqueous electrolyte was obtained by adding 0.5 parts by weight of VC, 0.1 parts by weight of DPDS and 0.1 parts by weight of DTDS to 100 parts by weight of the same mixed solvent as in Example 1 and further dissolving therein 1.35 mol/L of $LiPF_6$ as a solute.

EXAMPLE 11

A non-aqueous electrolyte was obtained by adding 3.0 parts by weight of VC, 0.2 parts by weight of DPDS and 0.4 parts by weight of DTDS to 100 parts by weight of the same mixed solvent as in Example 1 and further dissolving therein 1.35 mol/L of $LiPF_6$ as a solute.

EXAMPLE 12

A non-aqueous electrolyte was obtained by adding 3.0 parts by weight of VC, 0.2 parts by weight of DPDS and 0.4 parts by weight of BMPDS to 100 parts by weight of the same mixed solvent as in Example 1 and further dissolving therein 1.35 mol/L of $LiPF_6$ as a solute.

EXAMPLE 13

A non-aqueous electrolyte was obtained by adding 3.0 parts by weight of VC, 0.4 parts by weight of DTDS and 0.2 parts by weight of BMPDS to 100 parts by weight of the same mixed solvent as in Example 1 and further dissolving therein 1.35 mol/L of $LiPF_6$ as a solute.

EXAMPLE 14

A non-aqueous electrolyte was obtained by adding 0.5 parts by weight of VC, 0.1 parts by weight of DPDS, 0.1 parts by weight of DTDS and 0.1 parts by weight of BMPDS to 100 parts by weight of the same mixed solvent as in Example 1 and further dissolving therein 1.35 mol/L of $LiPF_6$ as a solute.

EXAMPLE 15

A non-aqueous electrolyte was obtained by adding 3.0 parts by weight of VC, 0.2 parts by weight of DPDS, 0.2 parts by weight of DTDS and 0.2 parts by weight of BMPDS to 100 parts by weight of the same mixed solvent as in Example 1 and further dissolving therein 1.35 mol/L of $LiPF_6$ as a solute.

COMPARATIVE EXAMPLE 4

A non-aqueous electrolyte was obtained by adding 0.5 parts by weight of VC to 100 parts by weight of the same mixed solvent as in Example 1 and further dissolving therein 1.35 mol/L of $LiPF_6$ as a solute.

COMPARATIVE EXAMPLE 5

A non-aqueous electrolyte was obtained by adding 0.5 parts by weight of DPDS to 100 parts by weight of the same mixed solvent as in Example 1 and further dissolving therein 1.35 mol/L of $LiPF_6$ as a solute.

EXAMPLE 16

A non-aqueous electrolyte was obtained by adding 2.0 parts by weight of PC, 4.0 parts by weight of PS and 0.5 parts by weight of VC to 100 parts by weight of the same mixed solvent as in Example 1 and further dissolving therein 1.35 mol/L of $LiPF_6$ as a solute.

EXAMPLE 17

A non-aqueous electrolyte was obtained by adding 2.0 parts by weight of PC, 4.0 parts by weight of PS and 0.2 parts by weight of DPDS to 100 parts by weight of the same mixed solvent as in Example 1 and further dissolving therein 1.35 mol/L of $LiPF_6$ as a solute.

EXAMPLE 18

A non-aqueous electrolyte was obtained by adding 2.0 parts by weight of PC, 4.0 parts by weight of PS and 0.2 parts by weight of DTDS to 100 parts by weight of the same mixed solvent as in Example 1 and further dissolving therein 1.35 mol/L of $LiPF_6$ as a solute.

EXAMPLE 19

A non-aqueous electrolyte was obtained by adding 2.0 parts by weight of PC, 4.0 parts by weight of PS and 0.2 parts by weight of BMPDS to 100 parts by weight of the same mixed solvent as in Example 1 and further dissolving therein 1.35 mol/L of $LiPF_6$ as a solute.

EXAMPLE 20

A non-aqueous electrolyte was obtained by adding 2.0 parts by weight of PC, 4.0 parts by weight of PS, 0.8 parts by weight of VC and 0.2 parts by weight of DPDS to 100 parts by weight of the same mixed solvent as in Example 1 and further dissolving therein 1.35 mol/L of $LiPF_6$ as a solute.

EXAMPLE 21

A non-aqueous electrolyte was obtained by adding 2.0 parts by weight of PC, 4.0 parts by weight of PS, 0.8 parts by weight of VC and 0.2 parts by weight of DTDS to 100 parts by weight of the same mixed solvent as in Example 1 and further dissolving therein 1.35 mol/L of $LiPF_6$ as a solute.

EXAMPLE 22

A non-aqueous electrolyte was obtained by adding 2.0 parts by weight of PC, 4.0 parts by weight of PS, 0.8 parts by weight of VC and 0.2 parts by weight of BMPDS to 100 parts by weight of the same mixed solvent as in Example 1 and further dissolving therein 1.35 mol/L of $LiPF_6$ as a solute.

EXAMPLE 23

A non-aqueous electrolyte was obtained by adding 2.0 parts by weight of PC, 4.0 parts by weight of PS, 0.2 parts by weight of DPDS and 0.2 parts by weight of DTDS to 100 parts by weight of the same mixed solvent as in Example 1 and further dissolving therein 1.35 mol/L of $LiPF_6$ as a solute.

EXAMPLE 24

A non-aqueous electrolyte was obtained by adding 2.0 parts by weight of PC, 4.0 parts by weight of PS, 0.2 parts by weight of DPDS and 0.2 parts by weight of BMPDS to 100 parts by weight of the same mixed solvent as in Example 1 and further dissolving therein 1.35 mol/L of $LiPF_6$ as a solute.

EXAMPLE 25

A non-aqueous electrolyte was obtained by adding 2.0 parts by weight of PC, 4.0 parts by weight of PS, 0.2 parts by weight of DTDS and 0.2 parts by weight of BMPDS to 100 parts by weight of the same mixed solvent as in Example 1 and further dissolving therein 1.35 mol/L of $LiPF_6$ as a solute.

EXAMPLE 26

A non-aqueous electrolyte was obtained by adding 2.0 parts by weight of PC, 4.0 parts by weight of PS, 0.8 parts by weight of VC, 0.2 parts by weight of DPDS and 0.2 parts by weight of DTDS to 100 parts by weight of the same mixed solvent as in Example 1 and further dissolving therein 1.35 mol/L of $LiPF_6$ as a solute.

EXAMPLE 27

A non-aqueous electrolyte was obtained by adding 2.0 parts by weight of PC, 4.0 parts by weight of PS, 0.8 parts by weight of VC, 0.2 parts by weight of DPDS and 0.2 parts by weight of BMPDS to 100 parts by weight of the same mixed solvent as in Example 1 and further dissolving therein 1.35 mol/L of $LiPF_6$ as a solute.

EXAMPLE 28

A non-aqueous electrolyte was obtained by adding 2.0 parts by weight of PC, 4.0 parts by weight of PS, 0.8 parts by weight of VC, 0.2 parts by weight of DTDS and 0.2 parts by weight of BMPDS to 100 parts by weight of the same mixed solvent as in Example 1 and further dissolving therein 1.35 mol/L of $LiPF_6$ as a solute.

EXAMPLE 29

A non-aqueous electrolyte was obtained by adding 2.0 parts by weight of PC, 4.0 parts by weight of PS, 0.2 parts by weight of DPDS, 0.2 parts by weight of DTDS and 0.2 parts by weight of BMPDS to 100 parts by weight of the same mixed solvent as in Example 1 and further dissolving therein 1.35 mol/L of $LiPF_6$ as a solute.

EXAMPLE 30

A non-aqueous electrolyte was obtained by adding 2.0 parts by weight of PC, 4.0 parts by weight of PS, 0.8 parts by weight of VC, 0.2 parts by weight of DPDS, 0.2 parts by weight of DTDS and 0.2 parts by weight of BMPDS to 100 parts by weight of the same mixed solvent as in Example 1 and further dissolving therein 1.35 mol/L of $LiPF_6$ as a solute.

(a) High Temperature Storage Test

A high temperature storage test was conducted on each of the lithium polymer secondary batteries produced using the non-aqueous electrolytes of Examples 1 to 30 and Comparative Examples 1 to 5.

In a thermostat at 25° C., each battery was charged with a current of 300 mA (0.6 C) until the battery voltage reached 4.2 V, and further charged at a constant voltage of 4.2 V until the current reached 50 mA (0.1 C). This battery was placed in a thermostat at 90° C., and, 4 hours later, the thickness of the battery was measured in the thermostat. The results are shown in Tables 1 to 3. In the tables, PC, PS, VC, DPDS, DTDS, and BMPDS represent propylene carbonate, 1,3-propanesultone, vinylene carbonate, diphenyl disulfide, di-p-tolyl disulfide, and bis(4-methoxyphenyl) disulfide, respectively.

(b) Charge/Discharge Cycle Test

A charge/discharge cycle test was conducted on each of the lithium polymer secondary batteries produced using the non-aqueous electrolytes of Examples 2 to 30 and Comparative Examples 1, 4 and 5.

After charging each battery in the same method as in the above-mentioned high temperature storage test, a cycle of performing GSM pulse discharge at an average current of 352 mA (pulse pattern discharge consisting of discharging at 1700 mA for 0.6 seconds and discharging at 150 mA for 0.004 seconds) to a final voltage of 3.0 V was repeated. Then, assuming that the initial discharge capacity was 100%, the capacity retention rate after 100 cycles was obtained. The results are shown in Tables 2 and 3.

TABLE 1

| | Amounts of additives per 100 parts by weight of non-aqueous solvent (part by weight) | | Increase in battery thickness |
|---|---|---|---|
| | PC | PS | (mm) |
| Example 1 | 2.0 | 4.0 | 0.241 |
| Comparative Example 1 | 0.0 | 0.0 | 1.160 |
| Comparative Example 2 | 6.0 | 0.0 | 0.350 |
| Comparative Example 3 | 0.0 | 6.0 | 0.308 |

TABLE 2

| | Amounts of additives per 100 parts by weight of non-aqueous solvent (part by weight) | | | | Increase in battery thickness | Capacity retention rate |
|---|---|---|---|---|---|---|
| | VC | DPDS | DTDS | BMPDS | (mm) | (%) |
| Example 2 | 0.5 | 0.1 | 0.0 | 0.0 | 1.26 | 91.1 |
| Example 3 | 0.5 | 0.0 | 0.1 | 0.0 | 1.22 | 90.7 |
| Example 4 | 0.5 | 0.0 | 0.0 | 0.1 | 1.25 | 91.2 |
| Example 5 | 3.0 | 0.4 | 0.0 | 0.0 | 1.21 | 91.3 |
| Example 6 | 3.0 | 0.0 | 0.4 | 0.0 | 1.20 | 90.3 |
| Example 7 | 3.0 | 0.0 | 0.0 | 0.4 | 1.19 | 91.0 |
| Example 8 | 0.5 | 0.1 | 0.0 | 0.1 | 1.18 | 89.9 |
| Example 9 | 0.5 | 0.0 | 0.1 | 0.1 | 1.24 | 90.8 |
| Example 10 | 0.5 | 0.1 | 0.1 | 0.0 | 1.25 | 90.3 |
| Example 11 | 3.0 | 0.2 | 0.4 | 0.0 | 1.26 | 91.4 |
| Example 12 | 3.0 | 0.2 | 0.0 | 0.4 | 1.25 | 91.0 |
| Example 13 | 3.0 | 0.0 | 0.4 | 0.2 | 1.20 | 91.2 |
| Example 14 | 0.5 | 0.1 | 0.1 | 0.1 | 1.21 | 89.9 |
| Example 15 | 3.0 | 0.2 | 0.2 | 0.2 | 1.22 | 91.3 |
| Comparative Example 1 | 0.0 | 0.0 | 0.0 | 0.0 | 1.16 | 79.7 |
| Comparative Example 4 | 0.5 | 0.0 | 0.0 | 0.0 | 1.22 | 84.8 |
| Comparative Example 5 | 0.0 | 0.5 | 0.0 | 0.0 | 1.23 | 83.9 |

TABLE 3

| | Amounts of additives per 100 parts by weight of non-aqueous solvent (part by weight) | | | | | | Increase in battery thickness | Capacity retention rate |
|---|---|---|---|---|---|---|---|---|
| | PC | PS | VC | DPDS | DTDS | BMPDS | (mm) | (%) |
| Example 16 | 2.0 | 4.0 | 0.5 | 0.0 | 0.0 | 0.0 | 0.241 | 89.9 |
| Example 17 | 2.0 | 4.0 | 0.0 | 0.2 | 0.0 | 0.0 | 0.212 | 88.5 |
| Example 18 | 2.0 | 4.0 | 0.0 | 0.0 | 0.2 | 0.0 | 0.203 | 89.5 |

TABLE 3-continued

|  | Amounts of additives per 100 parts by weight of non-aqueous solvent (part by weight) | | | | | | Increase in battery thickness | Capacity retention rate |
|---|---|---|---|---|---|---|---|---|
|  | PC | PS | VC | DPDS | DTDS | BMPDS | (mm) | (%) |
| Example 19 | 2.0 | 4.0 | 0.0 | 0.0 | 0.0 | 0.2 | 0.213 | 88.9 |
| Example 20 | 2.0 | 4.0 | 0.8 | 0.2 | 0.0 | 0.0 | 0.253 | 93.2 |
| Example 21 | 2.0 | 4.0 | 0.8 | 0.0 | 0.2 | 0.0 | 0.243 | 93.0 |
| Example 22 | 2.0 | 4.0 | 0.8 | 0.0 | 0.0 | 0.2 | 0.205 | 93.8 |
| Example 23 | 2.0 | 4.0 | 0.0 | 0.2 | 0.2 | 0.0 | 0.206 | 89.2 |
| Example 24 | 2.0 | 4.0 | 0.0 | 0.2 | 0.0 | 0.2 | 0.241 | 89.4 |
| Example 25 | 2.0 | 4.0 | 0.0 | 0.0 | 0.2 | 0.2 | 0.211 | 89.6 |
| Example 26 | 2.0 | 4.0 | 0.8 | 0.2 | 0.2 | 0.0 | 0.252 | 94.2 |
| Example 27 | 2.0 | 4.0 | 0.8 | 0.2 | 0.0 | 0.2 | 0.232 | 94.6 |
| Example 28 | 2.0 | 4.0 | 0.8 | 0.0 | 0.2 | 0.2 | 0.241 | 95.0 |
| Example 29 | 2.0 | 4.0 | 0.0 | 0.2 | 0.2 | 0.2 | 0.221 | 89.4 |
| Example 30 | 2.0 | 4.0 | 0.8 | 0.2 | 0.2 | 0.2 | 0.218 | 94.2 |
| Comparative Example 1 | 0.0 | 0.0 | 0.0 | 0.0 | 0.0 | 0.0 | 1.160 | 79.7 |

As is clear from Table 1, in Comparative Example 1, the generation of a gas during storage at 90° C. could not be reduced, and the thickness of the battery after 4-hour storage showed a large increase of 1.160 mm. On the other hand, in Example 1, the increase in the thickness of the battery was small compared to Comparative Example 2 using only PC and Comparative Example 3 using only PS, and it can be understood that the generation of gas was significantly reduced. A noticeable synergistic effect of using both PC and PS can be confirmed from these results.

As is clear from Table 2, in Comparative Example 1, the capacity retention rate after 100 cycles was 79.7%. In contrast, in Examples 2 to 15, capacity retention rates ranging from 89 to 91% were obtained. These are superior compared to Comparative Example 4 in which only VC was added and Comparative Example 5 in which only DPDS was added. An excellent synergistic effect of using VC with at least one selected from the group consisting of DPDS, DTDS and BMPDS can be confirmed from these results.

However, in Examples 2 to 15, the thicknesses of the batteries were increased, and generation of gas due to decomposition of additives during high temperature storage was suggested. However, since the amount of gas generated by the decomposition of additives is small, if the strength of the battery case is high like that of a cylindrical lithium secondary battery, the problem of an increase in the thickness of the battery does not occur. It is therefore possible to obtain only an excellent synergistic effect of using VC with at least one selected from the group consisting of DPDS, DTDS and BMPDS.

On the other hand, as is clear from Table 3, in the batteries of Examples 16 to 30, the increase in the thickness was 0.20 to 0.26 mm, and it can be understood that the generation of gas during high-temperature storage was sufficiently reduced. Moreover, since the batteries of Examples 16 to 30 had capacity retention rates ranging from 88 to 95% after 100 cycles, they had excellent cycle characteristics.

As described above, although VC, DPDS, DTDS and BMPDS have the effect of improving the cycle characteristics, it is considered that they are decomposed and generate gas during high-temperature storage. However, by using these additives with PC and PS, it is possible to reduce the generation of gas, thereby obtaining both the effect of reducing generation of gas and the effect of improving the cycle characteristics. Among them, when PC, PS, VC and at least one selected from the group consisting of DPDS, DTDS and BMPDS were used, an especially advantageous effect was obtained.

Note that Japanese Unexamined Patent Publication No. 10-247517 discloses that the addition of DPDS to the electrolyte improves the safety of the battery during overcharge. However, in one example of this, DPDS was added at a high concentration of around 3% to the electrolyte. In this case, although the safety during overcharge is improved, gas generation at high temperatures is remarkable, and the problem of gas generation can not be solved. Adding DPDS in a small amount of 0.1 to 0.6 wt % to the non-aqueous solvent like the present invention is important to reduce the generation of gas at high temperatures and improve the cycle characteristics.

Besides, Japanese Unexamined Patent Publication No. 2000-149986 discloses that the addition of DTDS to the electrolyte improves the cycle characteristics and storage characteristics of the battery. However, the problem of the storage characteristics of the battery can not be solved only by the addition of DTDS to the electrolyte. Using DTDS with VC, or with PC and PS as in the present invention is important to reduce the generation of gas at high temperatures and improve the cycle characteristics.

Further, Japanese Unexamined Patent Publication No. 11-67266 discloses an example of a battery containing PC, chain carbonate and VC. However, using VC in a small amount of 0.1 to 5.0 wt % with PC and PS for the non-aqueous solvent as in the present invention is important to reduce the generation of gas at high temperatures and improve the cycle characteristics.

Next, the amounts of additives added to a non-aqueous solvent were reviewed.

EXAMPLE 31

A non-aqueous electrolyte was obtained in the same manner as in Example 16, except that the amount of PC was 0.1 parts by weight and the amount of PS was 0.1 parts by weight per 100 parts by weight of the mixed solvent.

EXAMPLE 32

A non-aqueous electrolyte was obtained in the same manner as in Example 16, except that the amount of PC was 5.0 parts by weight and the amount of PS was 6.5 parts by weight per 100 parts by weight of the mixed solvent.

EXAMPLE 33

A non-aqueous electrolyte was obtained in the same manner as in Example 16, except that the amount of VC was 0.1 parts by weight per 100 parts by weight of the mixed solvent.

EXAMPLE 34

A non-aqueous electrolyte was obtained in the same manner as in Example 16, except that the amount of VC was 1.0 parts by weight per 100 parts by weight of the mixed solvent.

EXAMPLE 35

A non-aqueous electrolyte was obtained in the same manner as in Example 20, except that the amount of VC was 5.0 parts by weight per 100 parts by weight of the mixed solvent.

EXAMPLE 36

A non-aqueous electrolyte was obtained in the same manner as in Example 20, except that the amount of DPDS was 0.1 parts by weight per 100 parts by weight of the mixed solvent.

EXAMPLE 37

A non-aqueous electrolyte was obtained in the same manner as in Example 20, except that the amount of DPDS was 0.4 parts by weight per 100 parts by weight of the mixed solvent.

EXAMPLE 38

A non-aqueous electrolyte was obtained in the same manner as in Example 20, except that the amount of DPDS was 0.6 parts by weight per 100 parts by weight of the mixed solvent.

EXAMPLE 39

A non-aqueous electrolyte was obtained in the same manner as in Example 21, except that the amount of DTDS was 0.1 parts by weight per 100 parts by weight of the mixed solvent.

EXAMPLE 40

A non-aqueous electrolyte was obtained in the same manner as in Example 21, except that the amount of DTDS was 0.6 parts by weight per 100 parts by weight of the mixed solvent.

EXAMPLE 41

A non-aqueous electrolyte was obtained in the same manner as in Example 22, except that the amount of BMPDS was 0.1 parts by weight per 100 parts by weight of the mixed solvent.

EXAMPLE 42

A non-aqueous electrolyte was obtained in the same manner as in Example 22, except that the amount of BMPDS was 0.6 parts by weight per 100 parts by weight of the mixed solvent.

EXAMPLE 43

A non-aqueous electrolyte was obtained in the same manner as in Example 20, except that the amount of each of PC, PS, VC and DPDS was 0.1 parts by weight per 100 parts by weight of the mixed solvent.

EXAMPLE 44

A non-aqueous electrolyte was obtained in the same manner as in Example 20, except that the amounts of PC, PS, VC and DPDS were 5.0 parts by weight, 6.5 parts by weight, 5.0 parts by weight and 0.6 parts by weight, respectively, per 100 parts by weight of the mixed solvent.

EXAMPLE 45

A non-aqueous electrolyte was obtained in the same manner as in Example 21, except that the amount of each of PC, PS, VC and DTDS was 0.1 parts by weight per 100 parts by weight of the mixed solvent.

EXAMPLE 46

A non-aqueous electrolyte was obtained in the same manner as in Example 21, except that the amounts of PC, PS, VC and DTDS were 5.0 parts by weight, 6.5 parts by weight, 5.0 parts by weight and 0.6 parts by weight, respectively, per 100 parts by weight of the mixed solvent.

EXAMPLE 47

A non-aqueous electrolyte was obtained in the same manner as in Example 22, except that the amount of each of PC, PS, VC and BMPDS was 0.1 parts by weight per 100 parts by weight of the mixed solvent.

EXAMPLE 48

A non-aqueous electrolyte was obtained in the same manner as in Example 22, except that the amounts of PC, PS, VC and BMPDS were 5.0 parts by weight, 6.5 parts by weight, 5.0 parts by weight and 0.6 parts by weight, respectively, per 100 parts by weight of the mixed solvent.

For each of the lithium polymer secondary batteries produced using the non-aqueous electrolytes of Examples 31 to 48, a high temperature storage test was conducted in the same method as in Examples 1 to 30 and Comparative Examples 1 to 3, and a charge/discharge cycle test was performed in the same method as in Examples 2 to 15 and Comparative Examples 1, 4 and 5. The results are shown in Table 4.

TABLE 4

|  | Amounts of additives per 100 parts by weight of non-aqueous solvent (part by weight) | | | | | | Increase in battery thickness (mm) | Capacity retention rate (%) |
| --- | --- | --- | --- | --- | --- | --- | --- | --- |
|  | PC | PS | VC | DPDS | DTDS | BMPDS |  |  |
| Example 31 | 0.1 | 0.1 | 0.5 | 0.0 | 0.0 | 0.0 | 0.198 | 89.3 |
| Example 32 | 5.0 | 6.5 | 0.5 | 0.0 | 0.0 | 0.0 | 0.201 | 89.2 |
| Example 33 | 2.0 | 4.0 | 0.1 | 0.0 | 0.0 | 0.0 | 0.239 | 88.1 |
| Example 34 | 2.0 | 4.0 | 1.0 | 0.0 | 0.0 | 0.0 | 0.230 | 90.3 |
| Example 35 | 2.0 | 4.0 | 5.0 | 0.2 | 0.0 | 0.0 | 0.203 | 93.2 |
| Example 36 | 2.0 | 4.0 | 0.8 | 0.1 | 0.0 | 0.0 | 0.235 | 93.1 |
| Example 37 | 2.0 | 4.0 | 0.8 | 0.4 | 0.0 | 0.0 | 0.258 | 94.0 |
| Example 38 | 2.0 | 4.0 | 0.8 | 0.6 | 0.0 | 0.0 | 0.260 | 94.0 |
| Example 39 | 2.0 | 4.0 | 0.8 | 0.0 | 0.1 | 0.0 | 0.202 | 94.1 |
| Example 40 | 2.0 | 4.0 | 0.8 | 0.0 | 0.6 | 0.0 | 0.245 | 93.8 |
| Example 41 | 2.0 | 4.0 | 0.8 | 0.0 | 0.0 | 0.1 | 0.221 | 93.5 |
| Example 42 | 2.0 | 4.0 | 0.8 | 0.0 | 0.0 | 0.6 | 0.257 | 94.2 |
| Example 43 | 0.1 | 0.1 | 0.1 | 0.1 | 0.0 | 0.0 | 0.233 | 92.8 |
| Example 44 | 5.0 | 6.5 | 5.0 | 0.6 | 0.0 | 0.0 | 0.239 | 94.2 |
| Example 45 | 0.1 | 0.1 | 0.1 | 0.0 | 0.1 | 0.0 | 0.239 | 93.0 |
| Example 46 | 5.0 | 6.5 | 5.0 | 0.0 | 0.6 | 0.0 | 0.235 | 93.5 |
| Example 47 | 0.1 | 0.1 | 0.1 | 0.0 | 0.0 | 0.1 | 0.237 | 93.3 |
| Example 48 | 5.0 | 6.5 | 5.0 | 0.0 | 0.0 | 0.6 | 0.230 | 94.2 |

As is clear from Table 3 and Table 4, when the amounts of PC and VC are both 0.1 to 5.0 parts by weight per 100 parts by weight of the non-aqueous solvent, the thickness and capacity retention rate of the battery are both satisfactory. It can be understood from this that the preferred amounts of PC and VC are both 0.1 to 5.0 parts by weight per 100 parts by weight of the non-aqueous solvent.

Moreover, when the amount of PS is 0.1 to 6.5 parts by weight per 100 parts by weight of the non-aqueous solvent, the thickness and capacity retention rate of the battery are both satisfactory. It can be understood from this that the preferred amount of PS is 0.1 to 6.5 parts by weight per 100 parts by weight of the non-aqueous solvent.

Further, when the amount of each of DPDS, DTDS and BMPDS is 0.1 to 0.6 parts by weight per 100 parts by weight of the non-aqueous solvent, the thickness and capacity retention rate of the battery are both satisfactory. It can be understood from this that the preferred amount of each of DPDS, DTDS and BMPDS is 0.1 to 0.6 parts by weight per 100 parts by weight of the non-aqueous solvent.

Besides, when the total amount of these additives is 0.4 to 17.1 wt %, the thickness and capacity retention rate of the battery are both satisfactory. It can be understood from this that, when PC, PS, VC and at least one selected from the group consisting of DPDS, DTDS and BMPDS are added, their total amount is preferably 0.4 to 17.1 parts by weight.

In particular, when the battery contains at least one selected from the group consisting of DPDS, DTDS and BMPDS in addition to PC, PS and VC, the best charge/discharge characteristic is obtained.

Note that Examples 1 to 48 described above do not limit combinations of additives in the present invention. The present invention includes every combination of additives. Additionally, while Examples 1 to 48 relate to lithium polymer secondary batteries including a laminated type electrode group, the present invention is not limited to these.

INDUSTRIAL APPLICABILITY

According to the present invention, it is possible to provide a non-aqueous electrolyte capable of providing a non-aqueous electrolyte secondary battery with excellent cycle characteristics, capacity retention rate and storage characteristics and a reduced amount of gas generated during high-temperature storage; and a secondary battery using the non-aqueous electrolyte.

The invention claimed is:

1. A non-aqueous electrolyte comprising a non-aqueous solvent, a solute dissolved in said non-aqueous solvent, propylene carbonate in an amount of 0.1 to 5.0 parts by weight per 100 parts by weight of said non-aqueous solvent and 1, 3-propanesultone in an amount of 0.1 to 6.5 parts by weight per 100 parts by weight of said non-aqueous solvent, as additives, and at least one additional additive selected from the group consisting of vinylene carbonate, diphenyl disulfide, di-p-tolyl disulfide and bis(4-methoxyphenyl) disulfide.

2. The non-aqueous electrolyte in accordance with claim 1, comprising vinylene carbonate in an amount of 0.1 to 5.0 parts by weight and 0.1 to 0.6 parts by weight in total of said at least one selected from the group consisting of diphenyl disulfide, di-p-tolyl disulfide and bis(4-methoxyphenyl) disulfide as additives, respectively, per 100 parts by weight of said non-aqueous solvent.

3. The non-aqueous electrolyte in accordance with claim 2, wherein the total amount of said propylene carbonate, said 1,3-propanesultone, said vinylene carbonate and said at least one selected from the group consisting of diphenyl disulfide, di-p-tolyl disulfide and bis(4-methoxyphenyl) disulfide is 0.4 to 17.1 parts by weight per 100 parts by weight of said non-aqueous solvent.

4. The non-aqueous electrolyte in accordance with claim 1, wherein said non-aqueous solvent is composed of 10 to 70 wt % cyclic carbonate and 30 to 90 wt % chain carbonate.

5. The non-aqueous electrolyte in accordance with claim 4, wherein said cyclic carbonate comprises at least one selected from the group consisting of ethylene carbonate and butylene carbonate.

6. The non-aqueous electrolyte in accordance with claim 4, wherein said chain carbonate comprises at least one selected from the group consisting of dimethyl carbonate, diethyl carbonate and ethyl methyl carbonate.

7. A non-aqueous electrolyte secondary battery comprising: a positive electrode containing a lithium-containing composite metal oxide; a negative electrode containing graphite; and the non-aqueous electrolyte in accordance with claim 1.

8. The non-aqueous electrolyte secondary battery in accordance with claim 7, wherein at least one of said positive electrode and said negative electrode contains a fluorocarbon resin as a binder.

9. The non-aqueous electrolyte secondary battery in accordance with claim 8, wherein said fluorocarbon resin is at least one selected from the group consisting of polyvinylidene fluoride, a copolymer of vinylidene fluoride and hexafluoropropylene, and polytetrafluoroethylene.

10. The non-aqueous electrolyte secondary battery in accordance with claim 7, wherein said graphite is natural graphite or artificial graphite, and a spacing (d002) between lattice planes (002) thereof is 3.350 to 3.400 angstroms.

11. The non-aqueous electrolyte in accordance with claim 1, wherein the at least one additional additive comprises vinylene carbonate present in an amount of 0.1 to 5.0 parts by weight per 100 parts by weight of said non-aqueous solvent.

12. The non-aqueous electrolyte in accordance with claim 1, wherein the at least one additional additive comprises at least one selected from the group consisting of diphenyl disulfide di-p-tolyl disulfide and bis(4-methoxyphenyl) disulfide in an amount of 0.1 to 0.6 parts by weight per 100 parts by weight of said non-aqueous solvent.

* * * * *

UNITED STATES PATENT AND TRADEMARK OFFICE
CERTIFICATE OF CORRECTION

PATENT NO. : 7,132,199 B2  Page 1 of 1
APPLICATION NO. : 10/311811
DATED : November 7, 2006
INVENTOR(S) : Shigeyuki Unoki et al.

It is certified that error appears in the above-identified patent and that said Letters Patent is hereby corrected as shown below:

Title page, item (56)

Under "Foreign Patent Documents", add -- JP   2000-003724   1/2000 --.

Signed and Sealed this

Twenty-second Day of May, 2007

JON W. DUDAS
*Director of the United States Patent and Trademark Office*